US009442567B2

(12) United States Patent
Scott et al.

(10) Patent No.: US 9,442,567 B2
(45) Date of Patent: *Sep. 13, 2016

(54) GAZE SWIPE SELECTION

(71) Applicant: MICROSOFT TECHNOLOGY LICENSING, LLC, Redmond, WA (US)

(72) Inventors: Jason Scott, Redmond, WA (US); Arthur C. Tomlin, Kirkland, WA (US); Mike Thomas, Redmond, WA (US); Matthew Kaplan, Seattle, WA (US); Cameron G. Brown, Bellevue, WA (US); Jonathan Plumb, Seattle, WA (US); Nicholas Gervase Fajt, Seattle, WA (US); Daniel J. McCulloch, Kirkland, WA (US); Jeremy Lee, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,796

(22) Filed: Oct. 28, 2015

(65) Prior Publication Data

US 2016/0048204 A1 Feb. 18, 2016

Related U.S. Application Data

(63) Continuation of application No. 14/161,694, filed on Jan. 23, 2014, now Pat. No. 9,201,578.

(51) Int. Cl.
*G09G 5/08* (2006.01)
*G06F 3/033* (2013.01)
(Continued)

(52) U.S. Cl.
CPC ............. *G06F 3/013* (2013.01); *G02B 27/017* (2013.01); *G06F 3/012* (2013.01); *G06F 3/017* (2013.01);
(Continued)

(58) Field of Classification Search
CPC ........ G06F 3/013; G06F 3/017; G06F 3/011; G06F 3/048; G06F 3/012; G06F 3/0482; G06F 3/0483; G06F 3/0484; G06F 15/0291; G06F 2203/04803; G02B 27/017; G02B 27/01; G06K 9/00335; G09G 5/14
USPC ................... 345/156–184; 715/863
See application file for complete search history.

(56) References Cited

U.S. PATENT DOCUMENTS 7,561,143 B1 7/2009 Milekic
8,235,529 B1 8/2012 Raffle
(Continued)

OTHER PUBLICATIONS

Mollenbach, et al., "Eye Movements in Gaze Interaction", In Journal of Eye Movement Research, vol. 6, Issue 2, May 9, 3013, 15 pages.
(Continued)

Primary Examiner — Stephen Sherman
(74) Attorney, Agent, or Firm — Dan Choi; Micky Minhas

(57) ABSTRACT

Methods for enabling hands-free selection of virtual objects are described. In some embodiments, a gaze swipe gesture may be used to select a virtual object. The gaze swipe gesture may involve an end user of a head-mounted display device (HMD) performing head movements that are tracked by the HMD to detect whether a virtual pointer controlled by the end user has swiped across two or more edges of the virtual object. In some cases, the gaze swipe gesture may comprise the end user using their head movements to move the virtual pointer through two edges of the virtual object while the end user gazes at the virtual object. In response to detecting the gaze swipe gesture, the HMD may determine a second virtual object to be displayed on the HMD based on a speed of the gaze swipe gesture and a size of the virtual object.

20 Claims, 12 Drawing Sheets

(51) Int. Cl.
*G06F 3/01* (2006.01)
*G06F 3/0484* (2013.01)
*G06T 11/60* (2006.01)
*G02B 27/01* (2006.01)
*G06F 3/03* (2006.01)
*G06T 19/00* (2011.01)

(52) U.S. Cl.
CPC ......... *G06F 3/0304* (2013.01); *G06F 3/04842* (2013.01); *G06F 3/04845* (2013.01); *G06T 11/60* (2013.01); *G06T 19/006* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 8,743,021 B1 | 6/2014 | Park |
| 2010/0201621 A1 | 8/2010 | Niikawa |
| 2012/0257035 A1 | 10/2012 | Larsen |
| 2013/0083018 A1 | 4/2013 | Geisner et al. |
| 2013/0154913 A1 | 6/2013 | Genc et al. |
| 2013/0169560 A1 | 7/2013 | Cederlund et al. |
| 2013/0176208 A1 | 7/2013 | Tanaka et al. |
| 2013/0222638 A1 | 8/2013 | Wheeler et al. |
| 2013/0321265 A1* | 12/2013 | Bychkov ............... G06F 3/013 345/156 |

OTHER PUBLICATIONS

"International Search Report & Written Opinion for PCT Application No. PCT/US2015/011671", Mailed Date: Apr. 8, 2015, 12 Pages. (MS# 340160.02).

Office Action dated May 26, 2015, U.S. Appl. No. 14/161,694.

Response to Office Action dated Jul. 16, 2015, U.S. Appl. No. 14/161,694.

Notice of Allowance dated Jul. 31, 2015, U.S. Appl. No. 14/161,694.

* cited by examiner

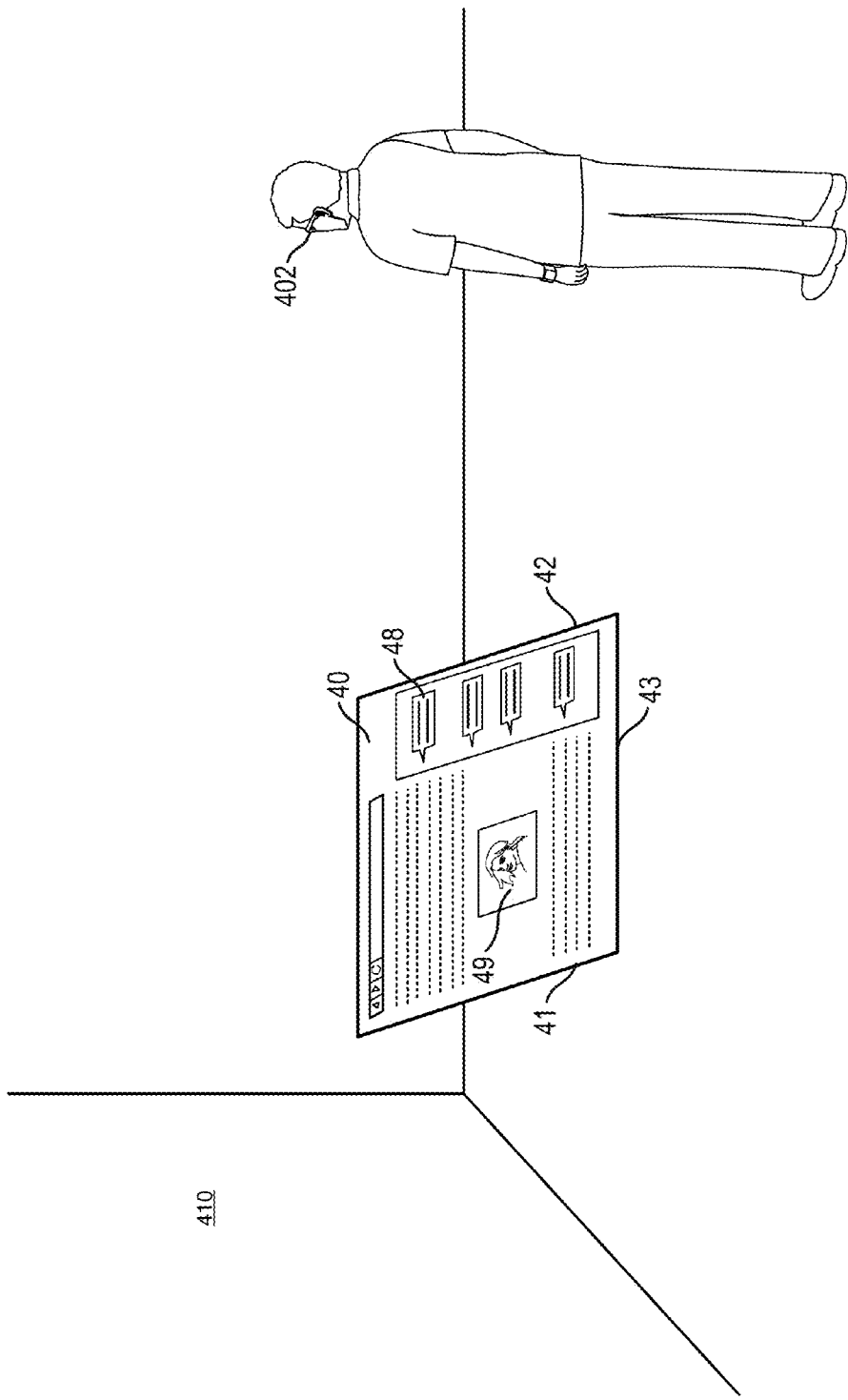

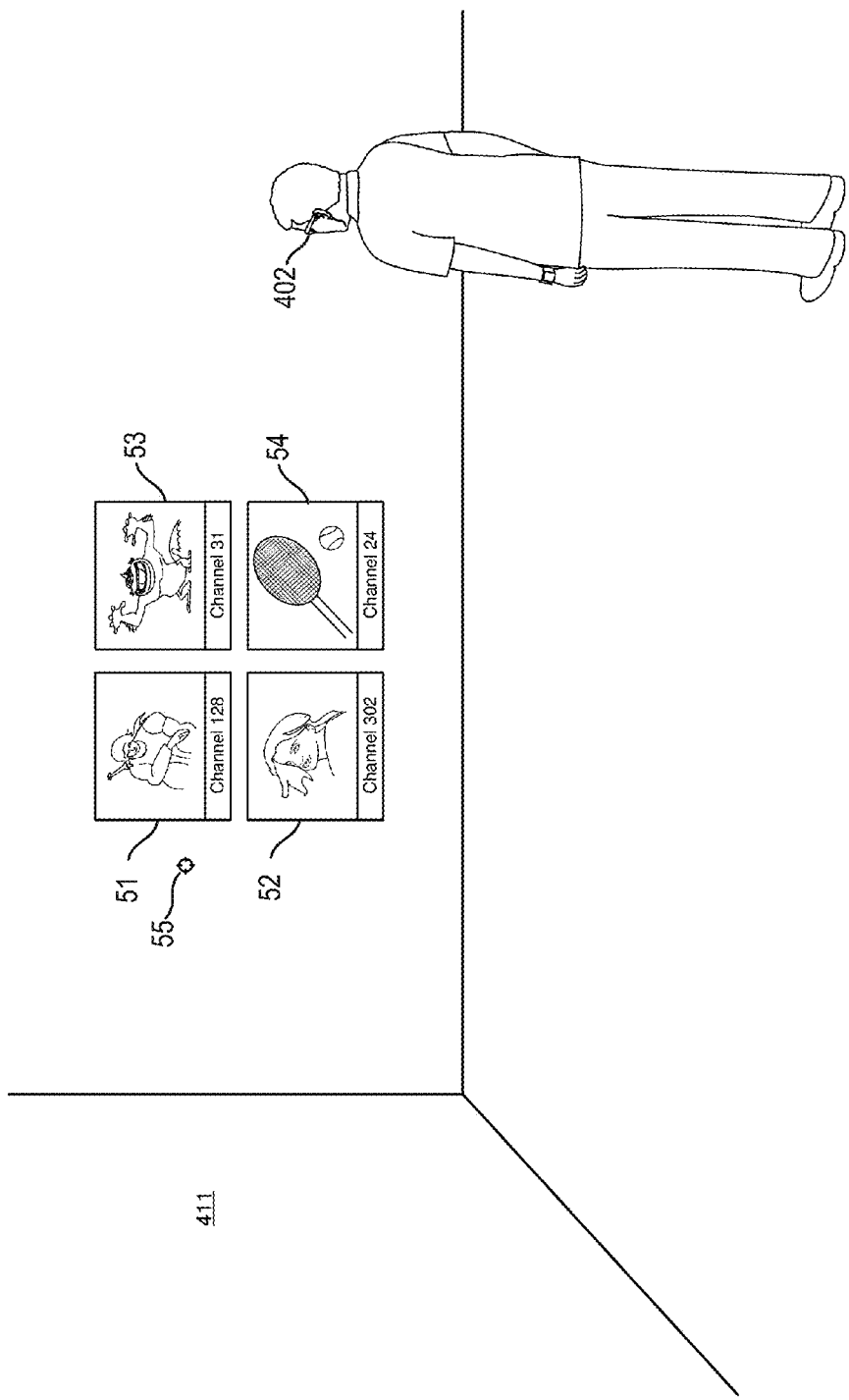

GAZE SWIPE SELECTION

CLAIM OF PRIORITY

The present application is a continuation application of U.S. patent application Ser. No. 14/161,694, entitled "Gaze Swipe Selection," filed Jan. 23, 2014, which is herein incorporated by reference in its entirety.

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for enabling hands-free selection of virtual objects within an augmented reality environment. In some embodiments, a selection of one or more virtual objects may be controlled using a gaze swipe interaction with the one or more virtual objects. A gaze swipe interaction with a virtual object may involve an end user of a head-mounted display device (HMD) performing head movements that are tracked by the HMD to detect whether a virtual pointer controlled by the end user has swiped across (or cut through) two or more edges of the virtual object. In some cases, the gaze swipe interaction may comprise a gaze swipe gesture in which the end user of the HMD uses their head movements to move the virtual pointer through two edges of the virtual object while the end user gazes at the virtual object. In response to detecting the gaze swipe gesture, the HMD may determine a second virtual object to be displayed on the HMD based on a speed of the gaze swipe gesture and a size of the virtual object through which the gaze swipe gesture was performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4A depicts one embodiment of an HMD worn by an end user viewing a virtual object within an augmented reality environment.

FIG. 4B depicts one embodiment of an HMD worn by an end user viewing virtual objects within an augmented reality environment.

DETAILED DESCRIPTION

Figure 1:
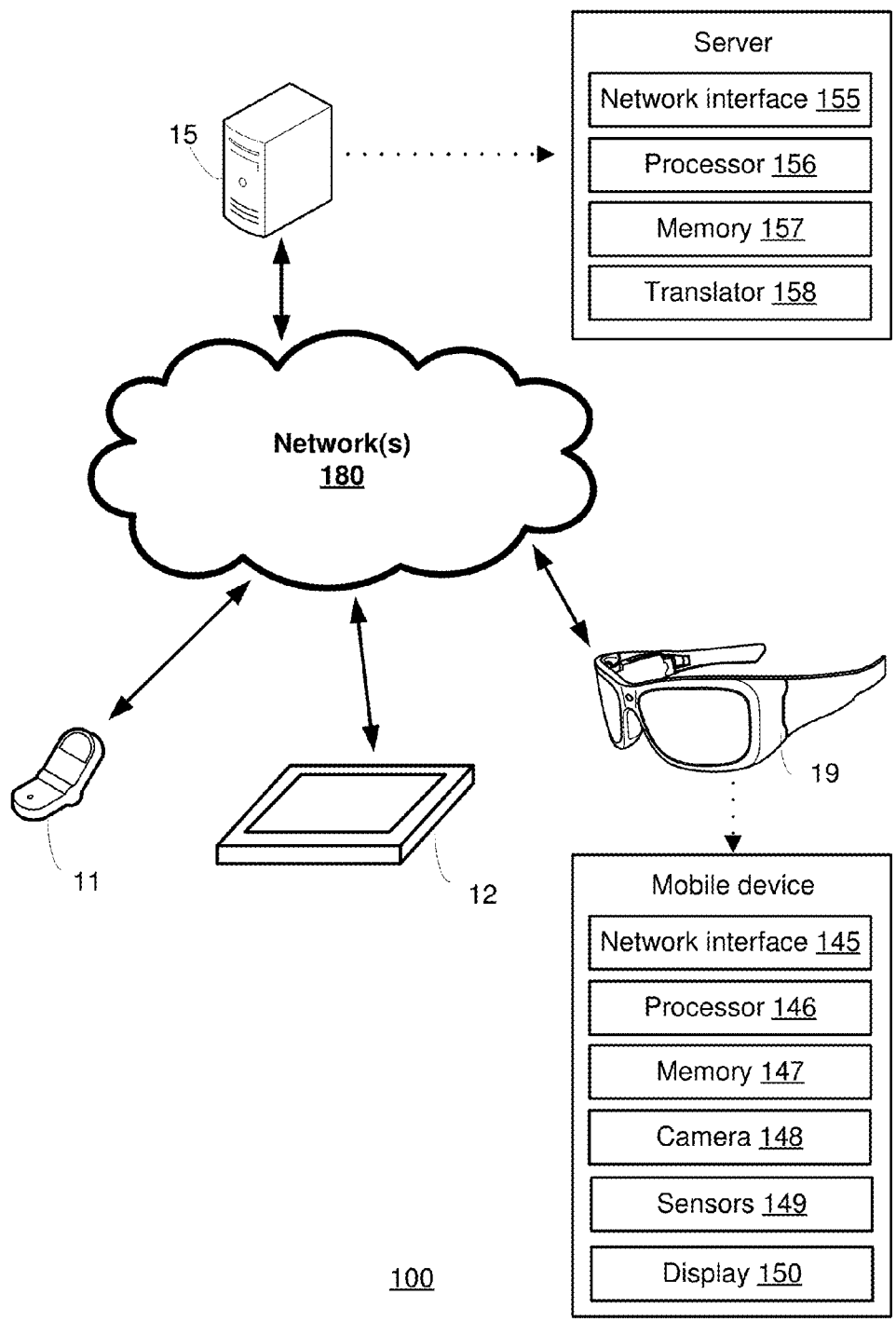
FIG. 1 is a block diagram of one embodiment of a networked computing environment in which the disclosed technology may be practiced.

Technology is described for enabling hands-free selection of virtual objects within an augmented reality environment. In some embodiments, a selection of one or more virtual objects may be controlled using a gaze swipe interaction with the one or more virtual objects. A gaze swipe interaction with a two-dimensional virtual object may involve an end user of a head-mounted display device (HMD) performing head movements that are tracked by the HMD to detect whether a virtual pointer controlled by the end user has swiped across (or cut through) two or more edges of the virtual object. The virtual pointer (e.g., a virtual laser pointer or virtual crosshairs) may be displayed to the end user of the HMD and may correspond with a head-locked forward vector extending from the end user's head. In some cases, the gaze swipe interaction may comprise a gaze swipe gesture in which the end user of the HMD uses their head movements to move the virtual pointer through two edges of the virtual object while the end user gazes at the virtual object. In response to detecting the gaze swipe gesture, the HMD may determine a second virtual object to be displayed on the HMD based on a speed of the gaze swipe gesture and a size of the virtual object through which the gaze swipe gesture was performed. The second virtual object may be displayed on the HMD subsequent to detecting the gaze swipe gesture.

One issue involving the hands-free selection of a virtual object by an end user of an HMD is that a false positive selection may be detected since the selection area for the virtual object and the identifying selection criteria may occupy the same area within an augmented reality environment. For example, an end user of an HMD may unintentionally select a virtual object including text (e.g., a virtual sign) while the end user is reading the text. Thus, there is a need for preventing the false selection of a virtual object when the virtual object is selectable using hands-free techniques, such as those that apply head tracking, eye tracking, and/or gaze tracking to the end user of the HMD.

In one embodiment, an augmented reality environment may include a first set of virtual objects of a first size (e.g., large virtual objects) and a second set of virtual objects of a second size different from the first size (e.g., small virtual objects). As the size of a virtual object may impact the ability for an end user of an HMD to intentionally select the virtual object, a first virtual object of the first set of virtual objects may be selected using a first gaze swipe gesture and a second virtual object of the second set of virtual objects may be selected using a second gaze swipe gesture different from the first gaze swipe gesture. In one example, the first gaze swipe gesture may comprise the end user using head movements to move a virtual pointer through any two of the first virtual object's edges (e.g., the virtual pointer may cut through the first virtual object in a vertical manner or a horizontal manner). However, in order to select the second virtual object, the second gaze swipe gesture may require additional motions to be performed by the end user. In one example, the second gaze swipe gesture may comprise the end user using head movements to move the virtual pointer through a highlighted (or specified) pair of edges of the second virtual object in a first direction. In another example, the second gaze swipe gesture may comprise the end user moving the virtual pointer through the highlighted pair of edges of the second virtual object in the first direction and then moving the virtual pointer back through the highlighted pair of edges in a second direction opposite to the first direction. In another example, the second gaze swipe gesture may comprise the end user moving the virtual pointer through at least three edges of the second virtual object.

In some cases, a virtual object may comprise a virtual book, a virtual television, a virtual web browser, or other virtual object that displays content to an end user of an HMD. The virtual object may comprise a shape bounded by a plurality of edges. In one example, the shape may comprise a square, a quadrilateral, or a polygon. In order to perform a first selection type (e.g., to move to the next channel associated with a virtual television or to the next page of a virtual book), an end user of an HMD may perform a first gaze swipe gesture swiping through a first edge and a second edge of the virtual object. In order to perform a second selection type different from the first selection type (e.g., to move to the previous channel associated with the virtual television or to the previous page of the virtual book), the end user of the HMD may perform a second gaze swipe gesture swiping through the first edge and a third edge of the virtual object. The second gaze swipe gesture may correspond with a different pair of edges than those traversed by the first gaze swipe gesture. In some cases, a first pair of edges of the virtual object may be highlighted using a first color (e.g., orange) to identify the first pair of edges and a second pair of edges of the virtual object may be highlighted using a second color (e.g., blue) to identify the second pair of edges. A directionality associated with a gaze swipe gesture may also be used to determine a corresponding selection type. For example, an end user swiping from left to right through a first pair of edges may trigger a first selection type, while the end user swiping from right to left through the first pair of edges may trigger a second selection type. In one example, a virtual object may correspond with a virtual web browser and the first selection type may move the virtual web browser back to a previously viewed webpage and the second selection type may correspond with the opening of a new tab.

In one embodiment, a gaze swipe gesture may cut through two or more virtual objects. A multiple-selection gaze swipe gesture may allow an end user of an HMD to select multiple virtual objects at the same time using a common gaze swipe gesture. In one example, a virtual object may correspond with an electronic folder for storing documents and images that includes eight images. In order to select three of the eight images, the end user may perform a gaze swipe gesture that cuts through the three images intended to be selected. The gaze swipe gesture may comprise one long gaze swipe motion that cuts through the three images. In another example, a virtual object may correspond with a virtual television. The end user may perform a first gaze swipe gesture to cut the virtual television and cause eight selection fragments corresponding with the last eight television channels viewed by the end user to be displayed as eight virtual objects. The end user may perform a gaze swipe gesture that cuts through two of the eight virtual objects which causes the virtual television to display the two channels selected (e.g., using a picture-in-picture format or a side-by-side format). In some cases, a plurality of individual swipe gestures may be used to select each selected object in a group of selected objects. In this case, an erroneously selected object may be deselected using a deselection swipe gesture (e.g., swiping the erroneously selected object in an opposite direction as that used to originally select the erroneously selected object).

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may comprise an HMD that provides an augmented reality environment including a virtual content reader. The virtual content reader may comprise a virtual object within the augmented reality environment in which content may be read by an end user of the HMD. In one embodiment, the virtual content reader may comprise a virtual object that appears fixed with respect to the end user's point of view (i.e., a head-locked virtual object). For example, the virtual content reader may appear in the top left corner of the end user's point of view regardless of how the end user turns their head. In another embodiment, the virtual content reader may comprise a virtual object that appears to maintain a coherent spatial relationship within the augmented reality environment (i.e., a world-locked virtual object). For example, as the end user turns their head or moves within the augmented reality environment, the images displayed to the end user on the HMD will change such that the virtual content reader appears to exist within the augmented reality environment at a particular location (e.g., on a wall).

In some embodiments, a selection of one or more virtual objects may be controlled using a gaze swipe gesture performed by an end user of an HMD. Prior to performing the gaze swipe gesture, the end user may perform a gaze swipe activation event in order to trigger a virtual pointer to appear next to a virtual object of interest. In one example, if the end user gazes at the virtual object for more than three seconds, then the virtual pointer will appear to one side of the virtual object and be controllable by the end user using their head movements. The virtual pointer may appear as a virtual laser pointer or as virtual crosshairs to the end user of the HMD. After the virtual pointer has been triggered, the virtual pointer may also be customized using one or more gaze swipe gestures (e.g., the end user may adjust the type of virtual pointer to be a highlighter or an object pickup hand cursor, the end user may also adjust the size of the virtual pointer or a degree of sensitivity associated with the virtual pointer based on head movements of the end user). In some cases, upon detection of the gaze swipe activation event, the edges of the virtual object may be highlighted corresponding with different selection options. The gaze swipe gesture may be detected when the end user of the HMD uses their head movements to move the virtual pointer through two edges of the virtual object while the end user gazes at the virtual object. In response to detecting the gaze swipe gesture, the HMD may determine a second virtual object to be displayed on the HMD based on a speed of the gaze swipe gesture (e.g., the second virtual object may be displayed only if the speed is above a set speed threshold).

Figure 2A:
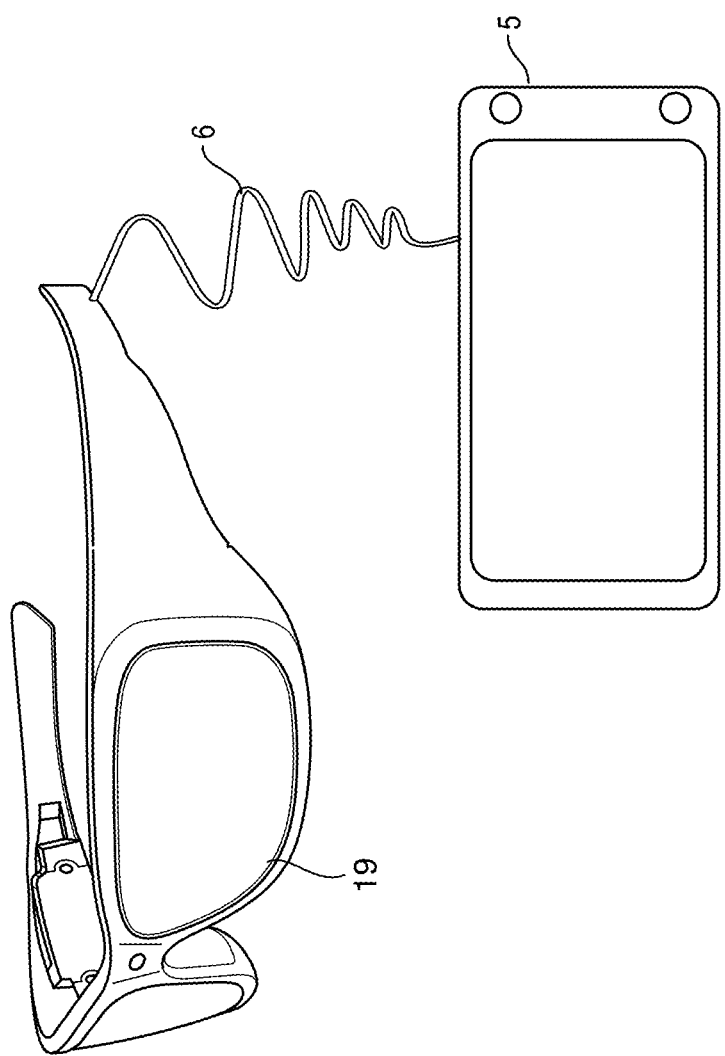
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5.

Figure 2B:
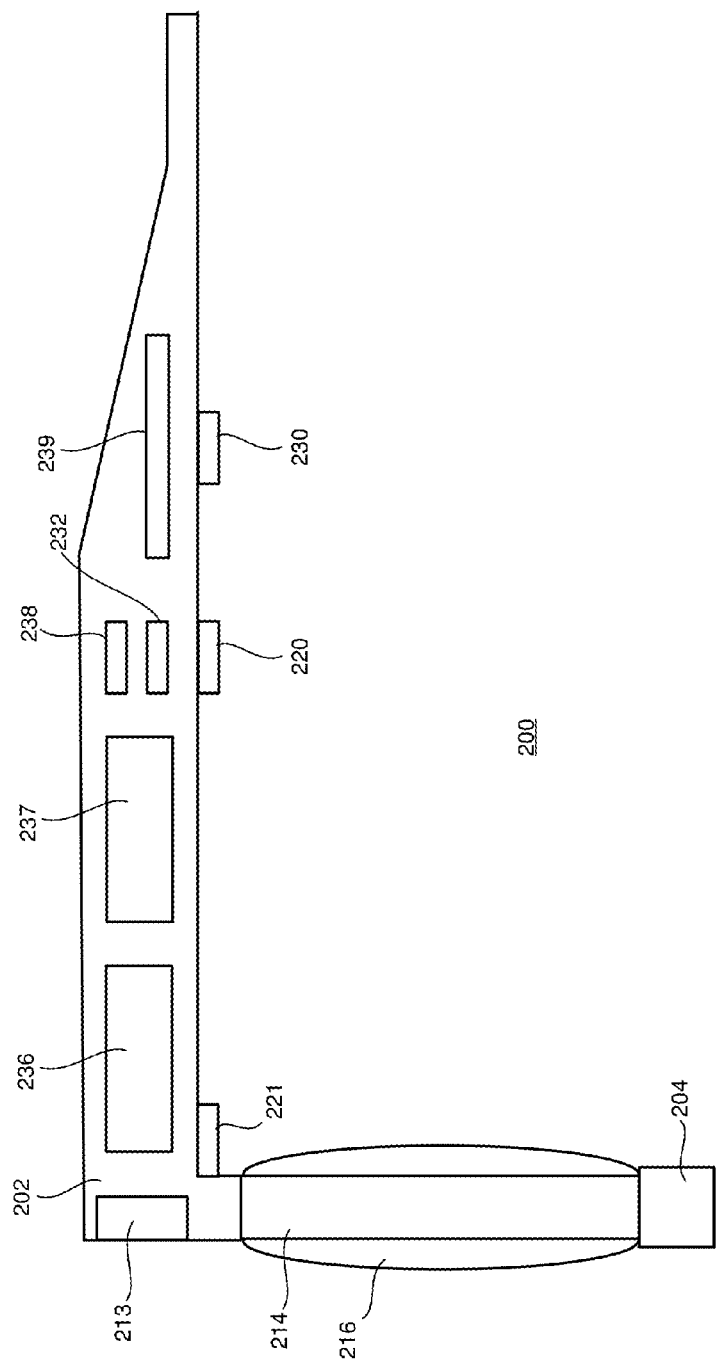
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
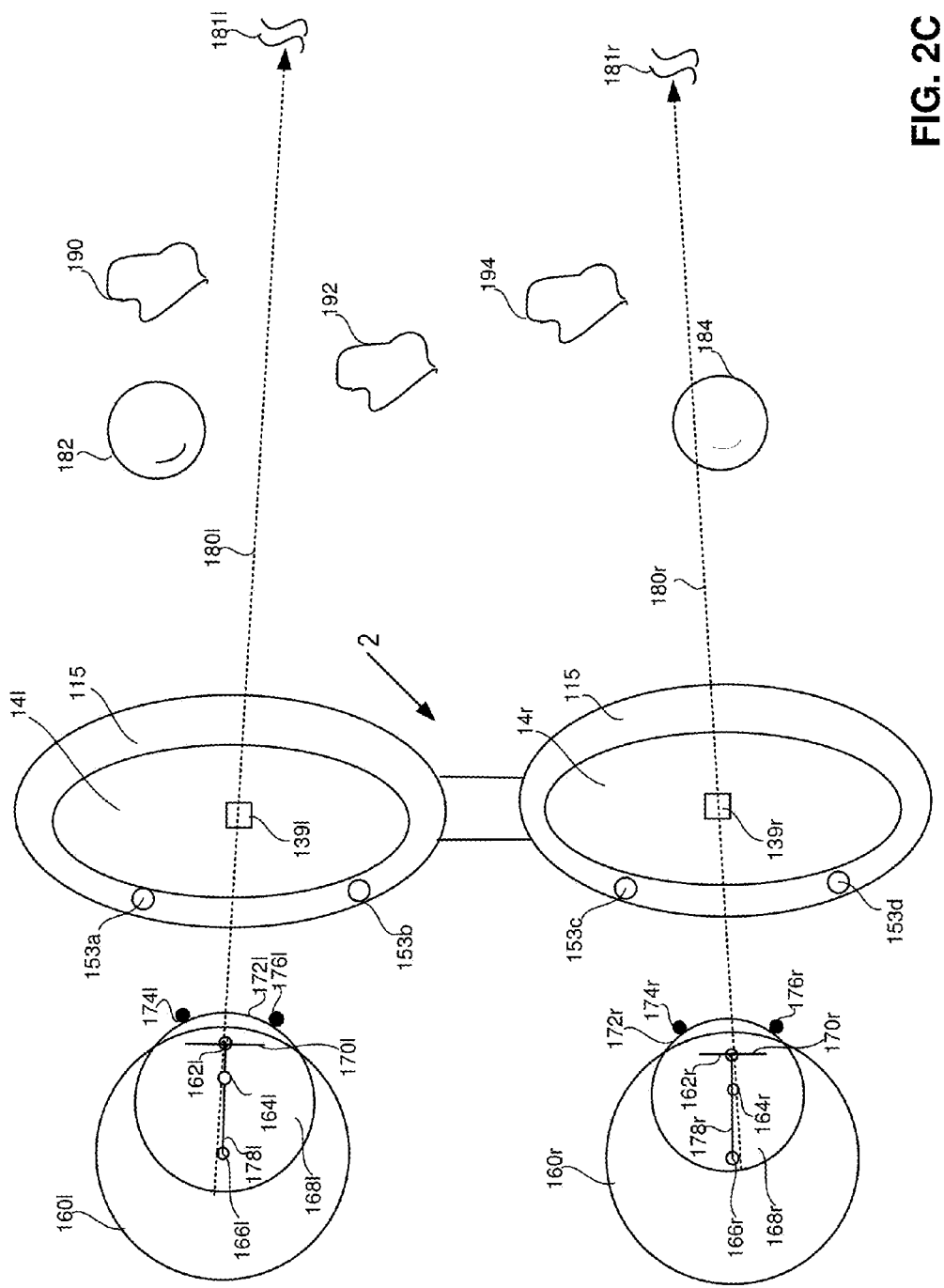
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
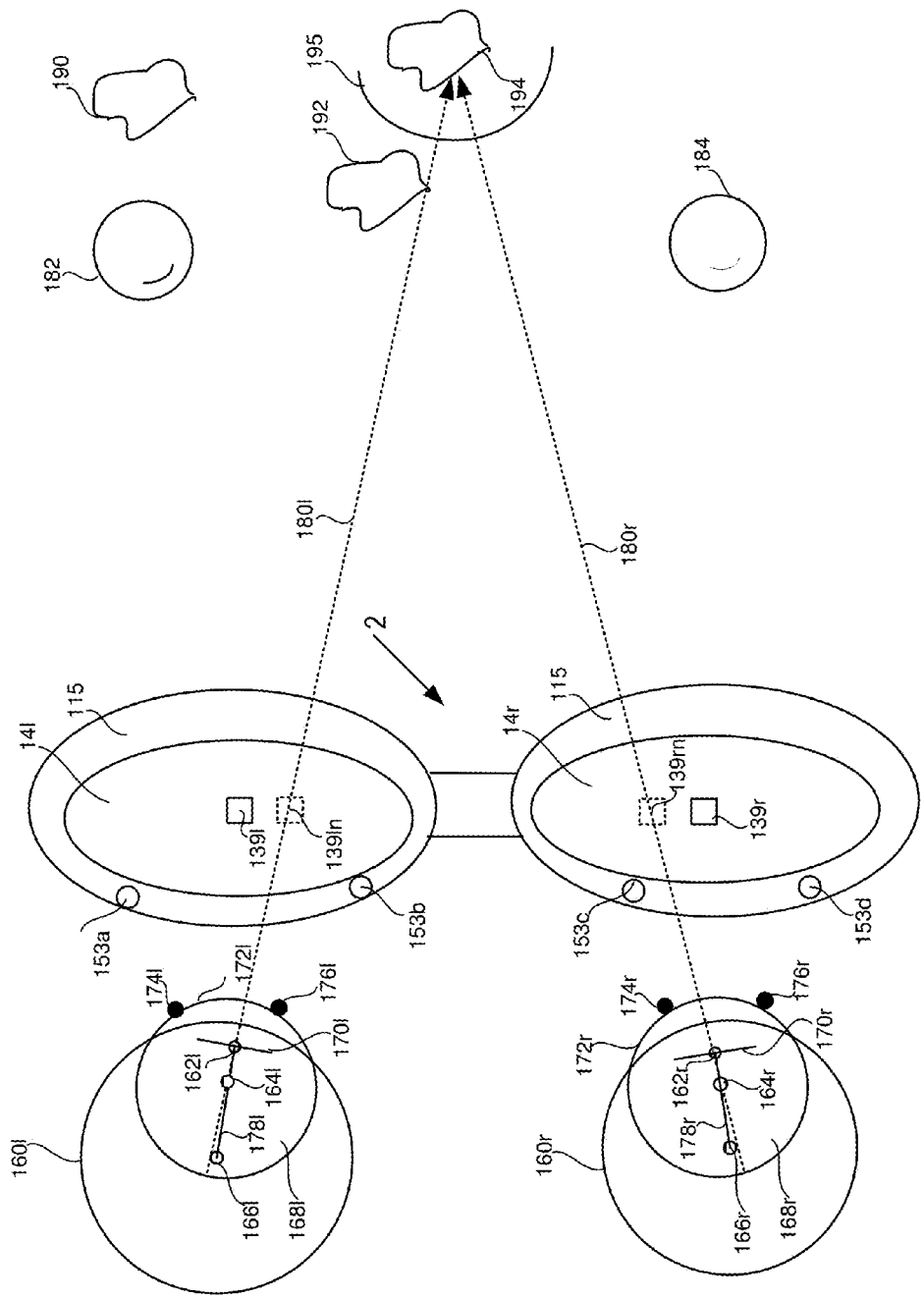
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No. 13/250,878, entitled "Personal Audio/Visual System," filed Sep. 30, 2011, which is herein incorporated by reference in its entirety.

Figure 3A:
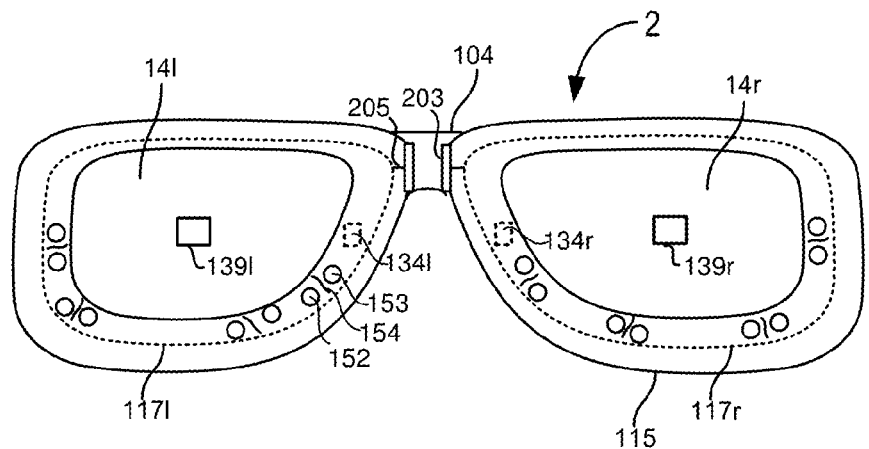
FIG. 3A depicts one embodiment of a portion of an HMD with movable display optical systems including gaze detection elements.

FIG. 3A depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 3A, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115. In some embodiments, the sensor 134 may comprise an image sensor or RGB camera for capturing images of an end user's eyes or facial features surrounding the eyes. Other inward facing image sensors may also be integrated with the frame 115 in order to capture fixed facial features associated with the end user such as their nasal bridge.

In one embodiment, the at least one sensor 134 may be a visible light camera (e.g., an RGB or color camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera may not be sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 3A, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 3A, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 3B:
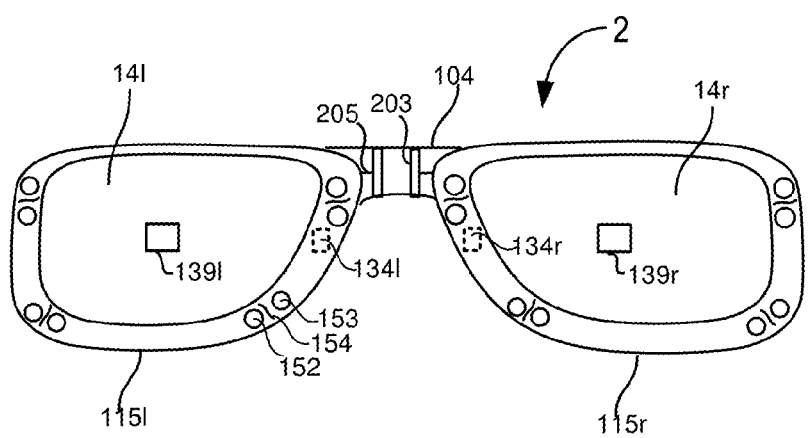
FIG. 3B depicts an alternative embodiment of a portion of an HMD with movable display optical systems including gaze detection elements.

FIG. 3B depicts an alternative embodiment of a portion of an HMD 2 with movable display optical systems including gaze detection elements. As depicted, each display optical system 14 is enclosed in a separate frame portion 115*l*, 115*r*. Each of the frame portions may be moved separately by the motors 203. In some embodiments, the at least one sensor 134 may comprise an image sensor or RGB camera for capturing images of an end user's eyes or facial features surrounding the eyes. Other inward facing image sensors may be integrated with the frame 115 in order to capture fixed facial features associated with the end user such as their nasal bridge.

FIG. 4A depicts one embodiment of an HMD 402 worn by an end user viewing a virtual object 40 within an augmented reality environment 410. The HMD 402 may comprise a mobile device, such as mobile device 19 in FIG. 1. The virtual object may comprise a virtual web browser that includes a first edge 41, a second edge 42, and a third edge 43. The virtual web browser may include a first selectable image 49 (e.g., that links to a second webpage) and a second selectable image 48 (e.g., corresponding with a hypertext link within a currently viewed webpage). In order to make selecting a hypertext link easier for the end user, one or more selectable images, such as selectable image 48, may appear to a side of the currently viewed webpage and allow the end user to perform a gaze swipe gesture through the selectable image in order to follow the hypertext link.

In one embodiment, a first gaze swipe gesture corresponding with the end user gaze swiping from left to right through edge 41 and edge 42 in a first direction may cause the virtual web browser to perform a first action (e.g., to move forward to the next webpage), while a second gaze swipe gesture corresponding with the end user gaze swiping from right to left through edge 42 and edge 41 and a second direction opposite to the first direction may cause the virtual web browser to perform a second action (e.g., to move backward to the previous webpage). In order to open a new tab or to enable the use of selectable images associated with hypertext links within a currently viewed webpage, the end user may perform a third gaze swipe gesture corresponding with the end user gaze swiping through edge 41 and edge 43. In order to select the second selectable image 48, the end user may perform a gaze swipe gesture in which the end user moves the virtual pointer through the second selectable image 48 in a first direction and then moves the virtual pointer back through the second selectable image 48 in a second direction opposite to the first direction within a particular period of time (e.g., the back and forth gaze swiping gesture is performed within two seconds).

In one embodiment, an action associated with a particular gaze swipe gesture may be altered or changed after the particular gaze swipe gesture has been performed. In one example, a first gaze swipe gesture (e.g., a left to right swipe through a virtual television) may correspond with a fast forward action at a first point in time and then after the first gaze swipe gesture has been performed the first gaze swipe gesture may then correspond with a 2× fast forward action at a second point in time subsequent to the first point in time. The actions associated with the particular gaze swipe gesture may be cascaded such that the first performance of the first gaze swipe gesture corresponds with a fast forward action, the second performance of the first gaze swipe gesture corresponds with a 2× fast forward action, and the third performance of the first gaze swipe gesture corresponds with a 4× fast forward action. A reverse gaze swipe gesture in the opposite direction of the first gaze swipe gesture may cause an undoing of the cascaded actions by stepping the action order back to a previous corresponding action. In some cases, a cancelling gaze swipe gesture may be performed in order to cancel the entire action stack. In some embodiments, a speed of the first performance of the first gaze swipe gesture may be used to determine a subsequent action corresponding with the second performance of the first gaze swipe gesture. In one example, if the speed of the first performance of the first gaze swipe gesture is greater than a threshold, then the second performance of the first gaze swipe gesture may correspond with an 8× fast forward action instead of the 2× fast forward action (i.e., the 2× and 4× fast forward actions may be skipped over based on the speed of the gaze swipe gesture).

FIG. 4B depicts one embodiment of an HMD 402 worn by an end user viewing virtual objects 51-54 within an augmented reality environment 411. The HMD 402 may comprise a mobile device, such as mobile device 19 in FIG. 1. Each of the virtual objects 51-54 may correspond with a television channel to be viewed using a virtual television (i.e., a television that is displayed to the end user of the HMD 402 as existing within the augmented reality environment 411). In one embodiment, after the end user of HMD 402 performs a first gaze swipe gesture that cuts through a virtual television (e.g., in a horizontal manner or a vertical manner), the virtual objects 51-54 may appear corresponding with the four television channels last viewed (or most recently viewed) by the end user. The end user may perform a second gaze swipe gesture that cuts through one of the virtual objects 51-54 in order to select a particular channel and to cause the virtual television to reappear and display the channel selected. In some cases, the end user may perform a second gaze swipe gesture that cuts through two of the four virtual objects 51-54 which causes the virtual television to reappear and to display the two channels selected (e.g., using a picture-in-picture format or a side-by-side format).

Prior to performing the second gaze swipe gesture, the end user may perform a gaze swipe activation event in order to trigger a virtual pointer 55 to appear next to virtual objects 51-54. In one example, if the end user gazes at virtual object 51 for more than two seconds, then the virtual pointer 55 will appear to the left side of virtual object 51 and be controllable by the end user using their head movements. In one embodiment, the second gaze swipe gesture may be detected when the end user of the HMD uses their head movement to move the virtual pointer 55 through two edges of the virtual object 51 while the end user gazes at the virtual object 51.

Figure 5A:
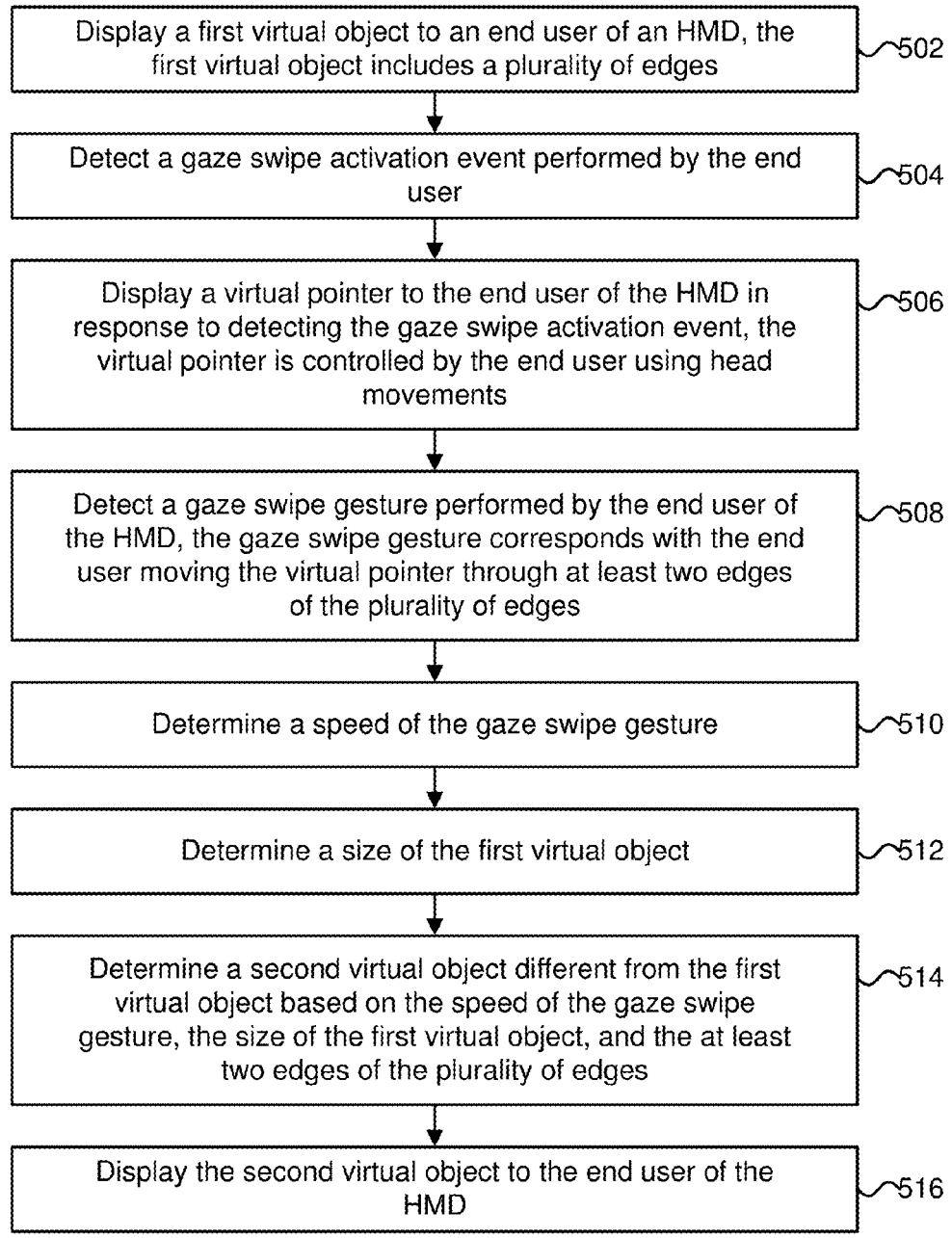
FIG. 5A is a flowchart describing one embodiment of a method for selecting a virtual object.

FIG. 5A is a flowchart describing one embodiment of a method for selecting a virtual object. In one embodiment, the process of FIG. 5A may be performed by a mobile device, such as mobile device 19 in FIG. 1.

In step 502, a first virtual object is displayed to an end user of an HMD. The first virtual object may include a plurality of edges or may be bounded by the plurality of edges. In some cases, the first virtual object may comprise a virtual book, a virtual television, a virtual web browser, or other virtual object that displays content to the end user of the HMD. The shape of the first virtual object may comprise a circle, a triangle, a square, a quadrilateral, or a polygon.

In step 504, a gaze swipe activation event performed by the end user is detected. The gaze swipe activation event may place the HMD into a state for detecting a gaze swipe gesture. After the HMD has been placed into the state for detecting a gaze swipe gesture, the head movements of the end user may be tracked using head tracking.

In step 506, a virtual pointer is displayed to the end user of the HMD in response to detecting the gaze swipe activation event. The virtual pointer may be controlled by the end user using head movements. In some embodiments, the end user may perform a gaze swipe activation event in order to trigger a virtual pointer to appear next to the first virtual object. In one example, if the end user gazes at the virtual object for more than three seconds, then the virtual pointer will appear to one side of the first virtual object or otherwise be placed outside the first virtual object such that it may be swiped through the first virtual object. In another example, if the end user gazes at the first virtual object and then closes one eye while still focusing on the first virtual object, then the virtual pointer will appear to one side of the first virtual object. The virtual pointer may appear as a virtual laser pointer or as virtual crosshairs to the end user of the HMD. The virtual pointer may correspond with a head-locked forward vector extending from the end user's head or from a fixed point on the HMD.

In some cases, upon detection of the gaze swipe activation event, one or more edges of the plurality of edges of the first virtual object may be highlighted corresponding with different virtual object selection options. In one example, a first pair of edges corresponding with a first selection type may be colored a first color (e.g., orange) to identify the first pair of edges and a second pair of edges corresponding with a second selection type may be colored a second color different from the first color (e.g., blue). The first selection type may correspond with moving to the next channel associated with a virtual television or to the next page of a virtual book. The second selection type may correspond with moving to the previous channel associated with a virtual television or to the previous page of a virtual book.

In step 508, a gaze swipe gesture performed by the end user of the HMD is detected. The gaze swipe gesture may correspond with the end user moving the virtual pointer through at least two edges of the plurality of edges. In one example, the gaze swipe gesture may comprise the end user using head movements to move the virtual pointer through any two of the first virtual object's edges (e.g., the virtual pointer may completely cut through the first virtual object in a vertical manner or a horizontal manner). In another example, the gaze swipe gesture may comprise the end user using head movements to move the virtual pointer through a first pair of edges of the first virtual object. In another example, the gaze swipe gesture may comprise the end user moving the virtual pointer through the first pair of edges of the first virtual object in a first direction and then moving the virtual pointer back through the first pair of edges in a second direction opposite to the first direction. In another example, the gaze swipe gesture may comprise the end user moving the virtual pointer through at least three edges of the first virtual object. In some cases, the order of the at least three edges to be traversed may be communicated to the end user using numbers overlaying each of the at least three edges. In some cases, the gaze swipe gesture may correspond with the end user moving the virtual pointer through at least two edges of the plurality of edges while the end user gazes at or maintains eye contact with the first virtual object.

In step 510, the speed of the gaze swipe gesture is determined. The speed of the gaze swipe gesture may be determined based on the time that it takes for the gaze swipe gesture to travel from a first edge of the first virtual object (e.g., an entry edge) to a second edge of the first virtual object (e.g., an exit edge). In one embodiment, a selection action (e.g., displaying a new virtual object) made in response to detecting the gaze swipe gesture may be performed only if the speed of the gaze swipe gesture is within a particular range of speeds (e.g., between 1 m/s and 5 m/s). In another embodiment, a selection action made in response to detecting the gaze swipe gesture may be performed only if the speed of the gaze swipe gesture is above a set speed threshold (e.g., the speed is greater than 3 m/s). In some cases, the selection type corresponding with the gaze swipe gesture may depend on the speed of the gaze swipe gesture. In one example, a gaze swipe gesture performed at a first speed may trigger a first selection type, while the gaze swipe gesture performed at a second speed faster than the first speed may trigger a second selection type different from the first selection type.

In step 512, a size of the first virtual object is determined. In some cases, the selection type corresponding with the gaze swipe gesture may depend on the size of the first virtual object. In one example, a gaze swipe gesture performed on the first virtual object of a first size may trigger a first selection type, while the gaze swipe gesture performed on the first virtual object of a second size larger than the first size may trigger a second selection type different from the first selection type.

In step 514, a second virtual object different from the first virtual object is determined based on the speed of the gaze swipe gesture, the size of the first virtual object, and the at least two edges of the plurality of edges that were traversed by the gaze swipe gesture. In step 516, the second virtual object is displayed to the end user of the HMD using the HMD. In one example, the first virtual object may correspond with a virtual web browser displaying a first webpage and the second virtual object may correspond with the virtual web browser displaying a second webpage different from the first webpage. In another example, the first virtual object may correspond with a virtual television displaying a first television channel and the second virtual object may correspond with the virtual television displaying a second television channel. In some cases, rather than displaying a new virtual object in response to detecting the gaze swipe gesture, the first virtual object may be reconfigured to display new information. In another example, the first virtual object may correspond with an electronic folder for storing files and/or images and the second virtual object may correspond with an opened version of the electronic folder displaying the contents of the electronic folder (e.g., displaying the files and subfolders stored within the electronic folder).

In some embodiments, a gaze swipe gesture may cut through two or more virtual objects. A multiple-selection gaze swipe gesture may allow the end user of the HMD to select multiple virtual objects at the same time using a common gaze swipe gesture. In one example, a virtual object may correspond with a virtual television. The end user may perform a first gaze swipe gesture to cut the virtual television into eight selection fragments corresponding with the eight television channels most recently viewed by the end user and to display eight virtual objects associated with the eight selection fragments. The end user may perform a second gaze swipe gesture that cuts through two of the eight virtual objects which causes the virtual television to display the two channels selected (e.g., using a picture-in-picture format or a side-by-side format).

Figure 5B:
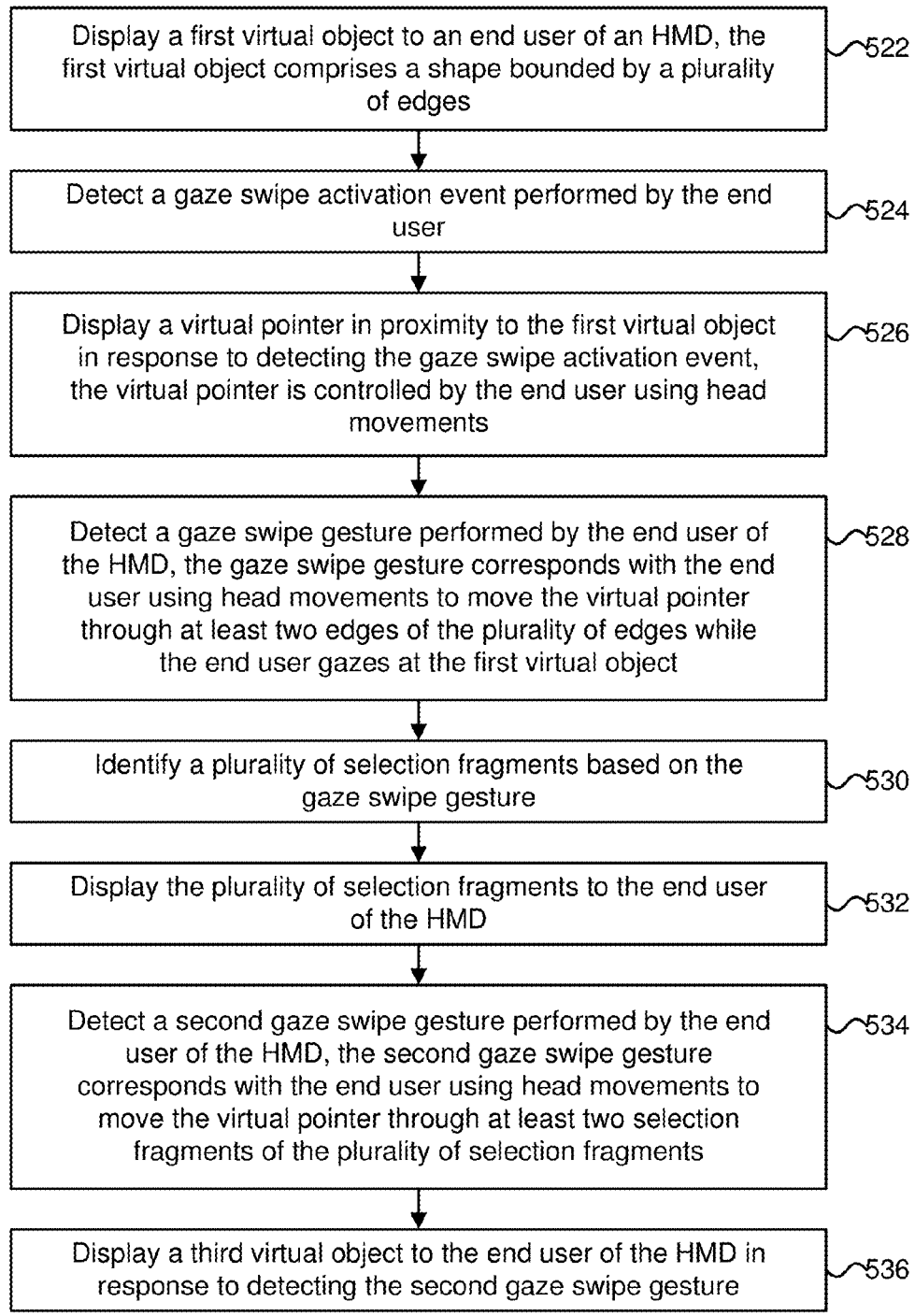
FIG. 5B is a flowchart describing an alternative embodiment of a method for selecting a virtual object.

FIG. 5B is a flowchart describing an alternative embodiment of a method for selecting a virtual object. In one embodiment, the process of FIG. 5B may be performed by a mobile device, such as mobile device 19 in FIG. 1.

In step 522, a first virtual object is displayed to an end user of an HMD. The first virtual object may comprise a shape that is bounded by a plurality of edges. In some cases, the first virtual object may comprise a virtual book, a virtual television, a virtual web browser, or other virtual object that displays content to the end user of the HMD. The shape of the first virtual object may comprise a circle, a triangle, a square, a quadrilateral, or a polygon.

In step 524, a gaze swipe activation event performed by the end user is detected. The gaze swipe activation event may place the HMD into a state for detecting a gaze swipe gesture. After the HMD has been placed into the state for detecting a gaze swipe gesture, the head movements of the end user may be tracked using head tracking.

In step 526, a virtual pointer is displayed to the end user of the HMD in proximity to the first virtual object in response to detecting the gaze swipe activation event. The virtual pointer may be controlled by the end user using head movements. In some embodiments, the end user may perform a gaze swipe activation event in order to trigger the virtual pointer to appear next to the first virtual object. In one example, if the end user gazes at the virtual object for more than three seconds, then the virtual pointer will appear to one side of the first virtual object or otherwise be placed outside the first virtual object such that it may be swiped through the first virtual object. In another example, if the end user gazes at the first virtual object and then closes one eye while still focusing on the first virtual object, then the virtual pointer will appear to one side of the first virtual object.

In step 528, a gaze swipe gesture performed by the end user of the HMD is detected. The gaze swipe gesture may correspond with the end user using head movements to move the virtual pointer through at least two edges of the plurality of edges while the end user gazes at the first virtual object. In one example, the gaze swipe gesture may comprise the end user using head movements to move the virtual pointer through any two of the first virtual object's edges (e.g., the virtual pointer may completely cut through the first virtual object in a vertical manner or a horizontal manner, and in any direction).

In step 530, a plurality of selection fragments is identified based on the gaze swipe gesture. In step 532, the plurality of selection fragments is displayed to the end user of the HMD. The plurality of selection fragments may be displayed to the end user of the HMD as a corresponding plurality of virtual objects within an augmented reality environment. In step 534, a second gaze swipe gesture performed by the end user of the HMD is detected. The second gaze swipe gesture may correspond with the end user using head movements to move the virtual pointer through at least two selection fragments of the plurality of selection fragments. In step 536, a third virtual object is displayed to the end user of the HMD in response to detecting the second gaze swipe gesture.

Figure 6:
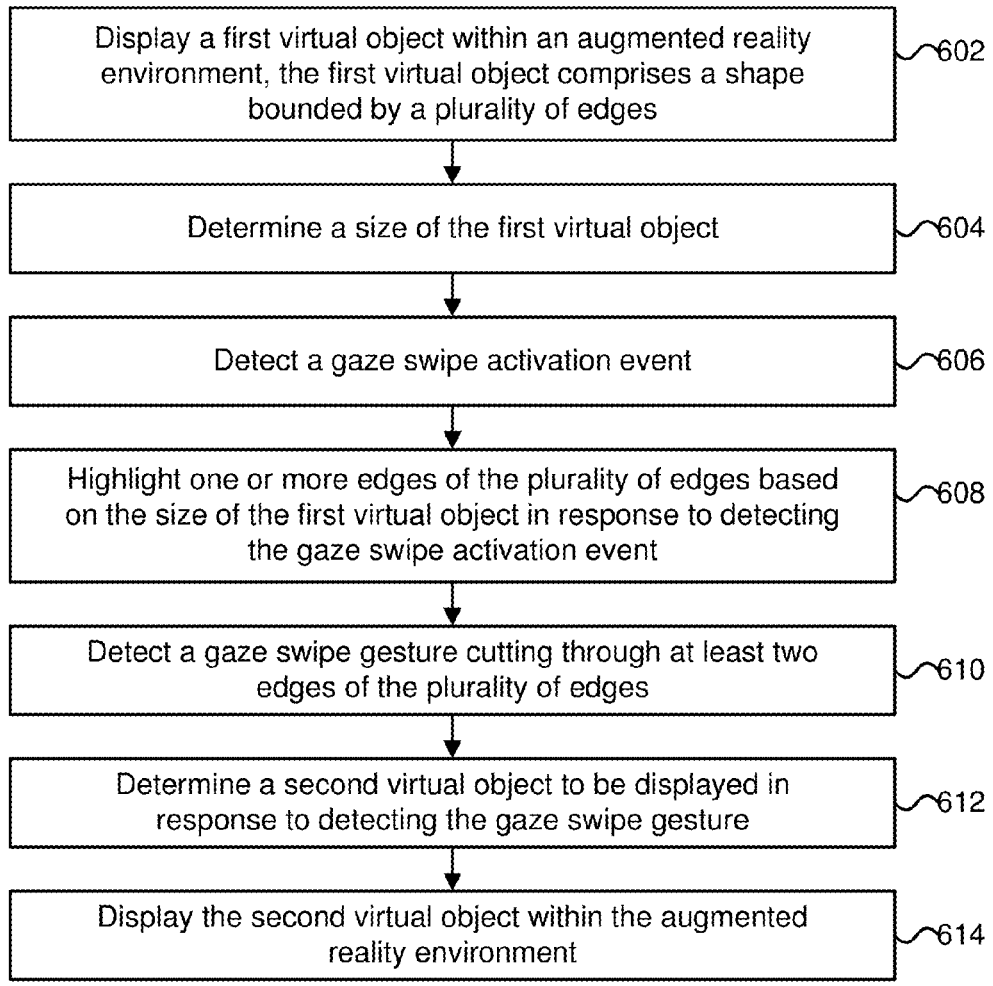
FIG. 6 is a flowchart describing one embodiment of a method for selecting a virtual object.

FIG. 6 is a flowchart describing one embodiment of a method for selecting a virtual object. In one embodiment, the process of FIG. 6 may be performed by a mobile device, such as mobile device 19 in FIG. 1.

In step 602, a first virtual object is displayed within an augmented reality environment. The first virtual object may comprise a shape that is bounded by a plurality of edges. The first virtual object may be displayed to an end user of an HMD. In some cases, the first virtual object may comprise a virtual book, a virtual television, a virtual web browser, or other virtual object that displays content to the end user of the HMD. The shape of the first virtual object may comprise a circle, a triangle, a square, a quadrilateral, or a polygon.

In step 604, a size of the first virtual object is determined. In step 606, a gaze swipe activation event is detected. The gaze swipe activation event may place an HMD into a state for detecting a gaze swipe gesture. After the HMD has been placed into the state for detecting a gaze swipe gesture, the head movements of the end user may be tracked using head tracking. The gaze swipe activation event may also enable the display of a virtual pointer that may be controlled by an end user of an HMD using head movements.

In step 608, one or more edges of the plurality of edges are highlighted based on the size of the first virtual object in response to detecting the gaze swipe activation event. In one embodiment, if the size of the first virtual object is above a size threshold, then a first pair of edges of the first virtual object may be highlighted using a first color (e.g., the top edge and the bottom edge of a square-shaped virtual object may be colored orange) and correspond with a first selection type. Otherwise, if the size of the first virtual object is below the size threshold, then the first pair of edges of the first virtual object may be highlighted using a second color (e.g., blue) and correspond with a second selection type different from the first selection type.

In step 610, a gaze swipe gesture cutting through at least two edges of the plurality of edges is detected. The gaze swipe gesture may be detected by an HMD. The gaze swipe gesture may correspond with an end user of the HMD using head movements to move a virtual pointer through the at least two edges of the plurality of edges while the end user gazes at the first virtual object. In one example, the gaze swipe gesture may comprise the end user using head movements to move the virtual pointer through any two of the first virtual object's plurality of edges (e.g., the virtual pointer may completely cut through the first virtual object in a vertical manner or a horizontal manner, and in any direction).

In step 612, a second virtual object to be displayed is determined in response to detecting the gaze swipe gesture. In step 614, the second virtual object is displayed within the augmented reality environment. In one example, the first virtual object may correspond with an electronic folder for storing files and/or images and the second virtual object may correspond with an opened version of the electronic folder displaying the contents of the electronic folder (e.g., displaying the files and subfolders stored within the electronic folder).

One embodiment of the disclosed technology includes one or more processors in communication with a see-through display. The see-through display displays a virtual object to an end user of the electronic device. The virtual object includes a plurality of edges. The one or more processors detect a gaze swipe activation event performed by the end user and display a virtual pointer to the end user in response to detecting the gaze swipe activation event. The one or more processors detect a gaze swipe gesture performed by the end user. The gaze swipe gesture corresponds with the end user moving the virtual pointer using one or more head movements through two or more edges of the plurality of edges. The one or more processors determine a speed of the gaze swipe gesture. The one or more processors determine a second virtual object different from the virtual object based on the speed of the gaze swipe gesture and the two or more edges of the plurality of edges traversed by the gaze swipe gesture. The one or more processors cause the second virtual object to be displayed using the see-through display.

One embodiment of the disclosed technology includes displaying the virtual object to an end user of the HMD. The virtual object includes a plurality of edges. The method further comprises detecting a gaze swipe activation event performed by the end user, displaying a virtual pointer to the end user of the HMD in response to detecting the gaze swipe activation event, and detecting a gaze swipe gesture performed by the end user of the HMD. The gaze swipe gesture corresponds with the end user moving the virtual pointer using one or more head movements through at least two edges of the plurality of edges. The method further comprises determining a speed of the gaze swipe gesture, determining a second virtual object different from the virtual object based on the speed of the gaze swipe gesture and the at least two edges of the plurality of edges traversed by the gaze swipe gesture, and displaying the second virtual object to the end user of the HMD.

One embodiment of the disclosed technology includes displaying the virtual object to an end user of the HMD. The virtual object comprises a shape that is bounded by a plurality of edges. The method further comprises detecting a gaze swipe activation event performed by the end user, displaying a virtual pointer to the end user of the HMD in response to detecting the gaze swipe activation event, detecting a gaze swipe gesture performed by the end user of the HMD. The gaze swipe gesture corresponds with the end user moving the virtual pointer using one or more head movements through two or more edges of the plurality of edges while the end user gazed at the virtual object. The detecting a gaze swipe gesture includes tracking the end user's one or more head movements using the HMD. The method further comprises determining a speed of the gaze swipe gesture, determining a second virtual object different from the virtual object based on the speed of the gaze swipe gesture and the two or more edges of the plurality of edges traversed by the gaze swipe gesture, and displaying the second virtual object to the end user of the HMD.

Figure 7:
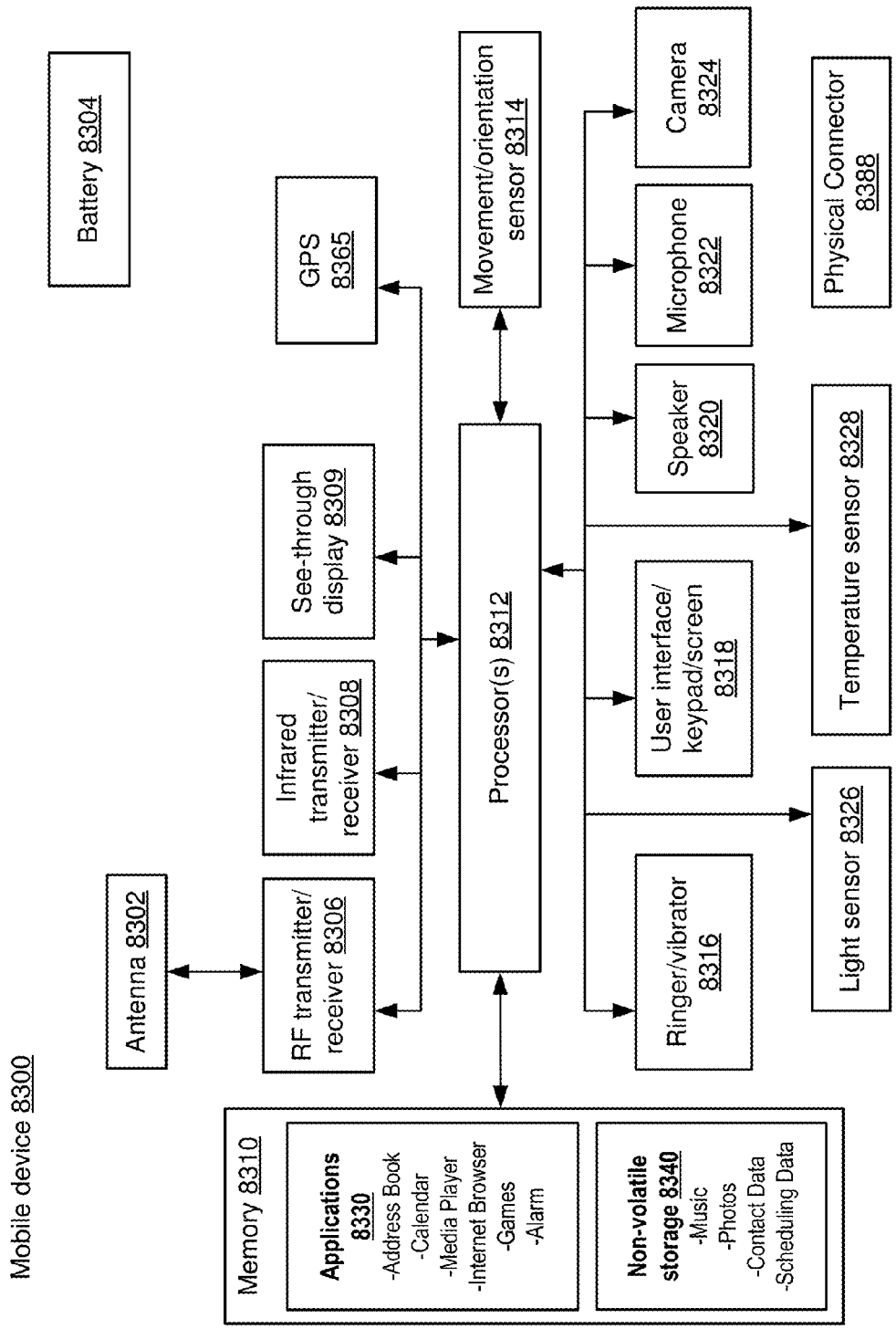
FIG. 7 is a block diagram of one embodiment of a mobile device.

FIG. 7 is a block diagram of one embodiment of a mobile device 8300, such as mobile device 19 in FIG. 1. Mobile devices may include laptop computers, pocket computers, mobile phones, HMDs, personal digital assistants, and hand-held media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semi-conductor chip. Acceleration direction, as well as orientation, vibration, and shock can be sensed. The one or more processors 8312 further communicate with a ringer/ vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device, comprising:
a display configured to display a virtual object, the virtual object includes a plurality of edges; and
one or more processors configured to detect a gaze swipe activation event performed by an end user of the electronic device and cause the display to display an order of edge traversals in response to detection of the gaze swipe activation event, the one or more processors configured to display the order of edge traversals by displaying symbols overlaying two or more edges of the plurality of edges, the one or more processors configured to detect a gaze swipe gesture performed by the end user that traverses through two or more edges of the plurality of edges based on the order of edge traversals, the one or more processors configured to determine a second virtual object different from the virtual object based on the two or more edges traversed by the gaze swipe gesture and cause the display to display the second virtual object.

2. The electronic device of claim 1, wherein:
the electronic device comprises a head-mounted display device;
the symbols comprise numbers;
the display comprises a see-through display of the head-mounted display device; and
the one or more processors configured to detect that the end user performed the gaze swipe gesture by tracking one or more head movements of the end user using the head-mounted display device.

3. The electronic device of claim 1, wherein:
the one or more processors configured to cause the display to display a virtual pointer in response to detection of the gaze swipe activation event, the one or more processors configured to detect that the end user moved the virtual pointer using one or more head movements through the two or more edges of the plurality of edges.

4. The electronic device of claim 3, wherein:
the electronic device comprises a head-mounted display device; and
the one or more processors configured to detect the gaze swipe gesture in response to detecting that the end user moved the virtual pointer through the two or more edges of the plurality of edges while the end user gazed at the virtual object, the one or more processors configured to detect that the end user gazed at the virtual object by tracking the end user's eye movements using the head-mounted display device.

5. The electronic device of claim 3, wherein:
the one or more processors configured to detect the gaze swipe gesture in response to detecting that the end user moved the virtual pointer through three or more edges of the plurality of edges while the end user gazed at the virtual object.

6. The electronic device of claim 1, wherein:
the one or more processors configured to determine a speed of the gaze swipe gesture and determine the second virtual object based on the speed of the gaze swipe gesture.

7. The electronic device of claim 1, wherein:
the one or more processors configured to determine a size of the virtual object and determine the second virtual object based on the size of the virtual object.

8. The electronic device of claim 1, wherein:
the virtual object comprises a shape that is bounded by the plurality of edges.

9. The electronic device of claim 1, wherein:
the gaze swipe activation event comprises the end user gazing at the virtual object for at least a threshold period of time.

10. A method, comprising:
displaying a virtual object to an end user of a head-mounted display device, the virtual object includes a plurality of edges;
detecting a gaze swipe activation event performed by the end user;
displaying an order of edge traversals in response to detecting the gaze swipe activation event, the displaying the order of edge traversals includes displaying symbols overlaying two or more edges of the plurality of edges;
detecting a gaze swipe gesture performed by the end user that traverses through two or more edges of the plurality of edges based on the order of edge traversals;
determining a second virtual object different from the virtual object based on the two or more edges traversed by the gaze swipe gesture; and
displaying the second virtual object using the head-mounted display device.

11. The method of claim 10, wherein:
the detecting a gaze swipe gesture includes tracking one or more head movements of the end user using the head-mounted display device; and
the symbols comprise numbers.

12. The method of claim 11, further comprising:
displaying a virtual pointer in response to detecting the gaze swipe activation event, the detecting a gaze swipe gesture includes detecting that the end user moved the virtual pointer through the two or more edges of the plurality of edges using the one or more head movements.

13. The method of claim 10, further comprising:
displaying a virtual pointer in response to detecting the gaze swipe activation event, the detecting a gaze swipe gesture includes detecting that the end user moved the virtual pointer through the two or more edges of the plurality of edges while the end user gazed at the virtual object.

14. The method of claim 10, further comprising:
displaying a virtual pointer in response to detecting the gaze swipe activation event, the detecting a gaze swipe gesture includes detecting that the end user moved the virtual pointer through three or more edges of the plurality of edges.

15. The method of claim 10, wherein:
the determining a second virtual object includes determining a speed of the gaze swipe gesture and determining the second virtual object based on the speed of the gaze swipe gesture.

16. The method of claim 10, wherein:
the determining a second virtual object includes determining a size of the virtual object and determining the second virtual object based on the size of the virtual object.

17. The method of claim 10, wherein:
the virtual object comprises a shape that is bounded by the plurality of edges.

18. The method of claim 10, wherein:
the gaze swipe activation event comprises the end user gazing at the virtual object for at least a threshold period of time.

19. The method of claim 10, further comprising:
highlighting the two or more edges in response to detecting the gaze swipe activation event, the two or more edges are associated with a first selection type.

20. One or more hardware storage devices containing computer readable code for programming one or more processors to perform a method comprising the steps of:
displaying a virtual object to an end user of a head-mounted display device, the virtual object includes a plurality of edges;
detecting a gaze swipe activation event performed by the end user;
displaying an order of edge traversals in response to detecting the gaze swipe activation event, the displaying an order of edge traversals includes displaying numbers overlaying two or more edges of the plurality of edges using the head-mounted display device;
detecting a gaze swipe gesture performed by the end user that traverses through the two or more edges based on the order of edge traversals, the detecting a gaze swipe gesture includes tracking one or more head movements of the end user using the head-mounted display device;
determining a second virtual object different from the virtual object based on the two or more edges traversed by the gaze swipe gesture; and
displaying the second virtual object using the head-mounted display device.

* * * * *